March 1, 1927. 1,618,997
J. H. RADANDT
LOCK FOR TIRE RIMS
Filed March 20, 1926
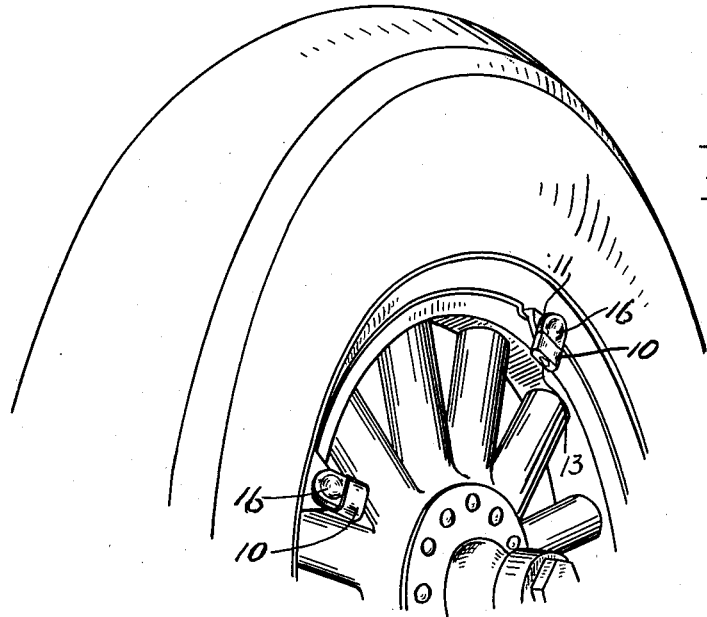
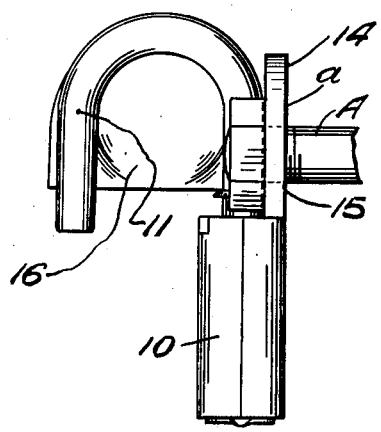
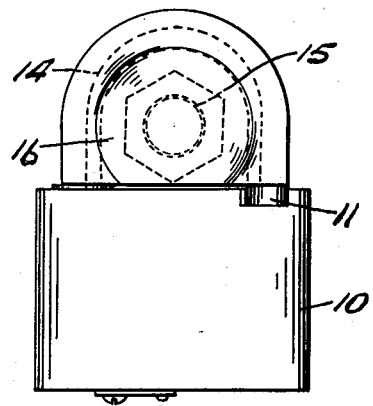
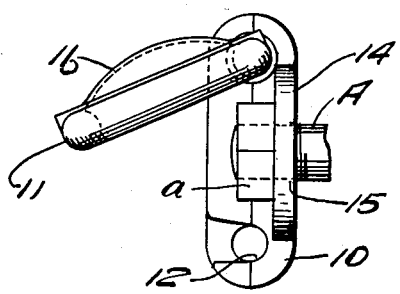
Inventor
J. H. Radandt
By Watson E. Coleman.
Attorney Patented Mar. 1, 1927.

1,618,997

UNITED STATES PATENT OFFICE.

JOSEPH H. RADANDT, OF EMMETT, IDAHO.

LOCK FOR TIRE RIMS.

Application filed March 20, 1926. Serial No. 96,242.

This invention relates to devices for locking a rim to an automobile wheel so that tire thieves cannot take the rim off the wheel and the general object of the invention is to provide a device of this character which is very simple, which can be used in connection with any ordinary lock, and which is very effective in actual practice.

A further object is to provide a device of this character which may be applied to one of the bolts of the rim and will prevent the nut of this bolt from being removed while the lock is in place and thus prevent the rim from being removed.

My invention is illustrated in the accompanying drawings wherein:—

Figure 1 is a perspective view of an automobile wheel provided with my improved rim lock;

Fig. 2 is an elevation of my lock in applied position;

Fig. 3 is a top plan view of the structure shown in Figure 2;

Fig. 4 is a front elevation of the lock with the hasp closed;

Fig. 5 is an under side plan view of the body of the lock;

Referring to these drawings 10 designates the body of a lock of any suitable character, such as a padlock, and provided with the oscillatable hasp 11 and the keeper portion 12. The hasp is not only oscillatable but it is longitudinally shiftable so as to carry its extremity into the keeper 12 and into engagement with the locking mechanism disposed within the body of the lock. When the hasp is shifted inward it is automatically locked in place and the hasp can only be unlocked by inserting a key in the barrel 13, illustrated as at the bottom of the lock body.

Attached to or formed as part of the rear wall of the lock is an upwardly extending web 14, having an aperture 15 through which the extremity of the bolt may be passed. This aperture is large enough to permit the bolt to pass but not large enough to let the nut coacting with the bolt pass through this aperture.

Attached to the hasp 11 and formed as part thereof, is a shield 16 which is bulged outward so as to accommodate the nut $a$ on the bolt A.

In the use of this device the nut is removed from one of the bolts holding the rim B to the tire. Preferably the bolt used is that one which is straight across from the valve stem. The hasp of the lock is then opened and the bolt is slipped through the aperture 15. The nut is then screwed back on the bolt and the hasp closed so that the shield plate 16 entirely encloses the nut. The body of the hasp 11, it will be seen, will cover the sides of the nut so that no instrument can be inserted through the plate 14 and the hasp 11 to cause the unscrewing of the nut from the bolt. Furthermore the recess formed by the plate 16 is so shallow as to prevent the nut from being removed off the end of the bolt even if it were unscrewed to some extent.

It is to be understood that the body of the lock is to be so constructed as to prevent water passing into the interior of the lock where the hasp is engaged with the lock and that a shield must be provided to prevent the entrance of water through the keyhole of the lock.

It will be seen that this device is very simple, that the principle of the device may be applied to many different forms of padlocks and that it may be modified in many ways without departing from the spirit of the invention as defined in the appended claims.

While I have illustrated my device as being applied to locking a rim upon a wheel felly, it is to be understood that this lock may also be used as a lock for spare tires.

I claim:—

1. A padlock having an oscillatable and longitudinally shiftable hasp, a web extending upward at the rear of the padlock parallel to the hasp when the lock is in a closed position, said web having an aperture through which a bolt may be passed, the hasp carrying a shield adapted to cover the end of the bolt and the nut thereon when the hasp is closed and locked.

2. A lock for preventing the removal of a nut from a bolt comprising a lock body, a U-shaped hasp mounted upon the body, a web carried by the body and having an aperture adapted to receive the bolt, the hasp having a shield adapted, when the hasp is closed, to extend over the extremity of the bolt and the nut thereon and preventing access to the nut.

3. The combination with a tire rim and a wheel to which the rim is attached, the rim and wheel having bolts preventing the removal of the rim from the wheel, and the bolts having nuts, of means for preventing the removal of the rim from the wheel comprising a padlock having a hasp, a web extending from the body of the padlock in a position parallel to the hasp when the lock is closed and locked, said web having an aperture through which a bolt on the rim passes, the aperture being smaller than the nut engaging said bolt, the hasp having a shield extending over the nut and into the bolt when the hasp is closed and locked to thereby prevent access to the nut and the removal of the nut from the bolt.

In testimony whereof I hereunto affix my signature.

JOSEPH H. RADANDT.